(12) United States Patent
Wahls

(10) Patent No.: US 6,336,619 B1
(45) Date of Patent: Jan. 8, 2002

(54) ADJUSTABLE SEAT PLATFORM

(75) Inventor: Robert J. Wahls, Pinckney, MI (US)

(73) Assignee: Michigan Seat Company, Jackson, MI (US)

( * ) Notice: Subject to any disclaimer, the term of this patent is extended or adjusted under 35 U.S.C. 154(b) by 7 days.

(21) Appl. No.: 09/597,663

(22) Filed: Jun. 21, 2000

(51) Int. Cl.[7] .............................................. F16M 13/00
(52) U.S. Cl. ...................... 248/424; 248/561; 248/429; 248/421
(58) Field of Search ................................. 248/424, 429, 248/419, 423, 370, 407, 561, 421

(56) References Cited

U.S. PATENT DOCUMENTS

| | | | | |
|---|---|---|---|---|
| 3,957,243 A | * | 5/1976 | Costin et al. ............... | 248/370 |
| 4,014,507 A | * | 3/1977 | Swenson ..................... | 248/407 |
| 4,029,283 A | * | 6/1977 | Swenson et al. ............ | 248/567 |
| 4,455,009 A | * | 6/1984 | Foster et al. ................ | 248/561 |
| 5,372,347 A | * | 12/1994 | Minnich ..................... | 248/371 |
| 5,584,460 A | * | 12/1996 | Ropp ......................... | 248/423 |
| 5,871,198 A | * | 2/1999 | Bostrom et al. ............ | 248/588 |
| 6,135,412 A | * | 10/2000 | Buehler ...................... | 248/421 |

* cited by examiner

Primary Examiner—Anita King
(74) Attorney, Agent, or Firm—Young & Basile, P.C.

(57) ABSTRACT

A seat platform for industrial and agricultural vehicles capable of supporting a seat for forward and rearward movement characterized by low cost and ease of assembly of a seat mount plate with a base plate wherein linear tracks defined on the seat mount plate cooperate with linear guides formed on the base plate.

7 Claims, 2 Drawing Sheets

ADJUSTABLE SEAT PLATFORM

BACKGROUND OF THE INVENTION

1. Field of the Invention

The invention pertains to vehicle seat supports permitting adjustment in forward and rear directions wherein the seat may be locked in a predetermined position.

2. Description of the Related Art

Industrial and agricultural vehicles such as lift trucks, tractors, garden tractors, mowers, and the like, include a seat for the operator that is often pivotally mounted to the vehicle adjacent the seat front end whereby the seat may be pivoted in a partially inverted relationship, usually for the purpose of protecting the seat from weather conditions. Further, such vehicle seats are sometimes adjustable in forward and rearward directions to provide maximum comfort for the operator to accommodate longer and shorter limbs. Forward and rearward seat adjustment movement is often accomplished through track and guide arrangements existing between components mounted upon the vehicle, and those affixed to the vehicle seat.

In known vehicle seat constructions of this type, assembly of the vehicle mounted portions of the seat structure with the seat mounted portions often are difficult to accomplish because of clearance and access limitations. Also, the assembly of the seat to its vehicle mounted structure is often difficult and care must be taken to insure that the assembly is proper so that limited movement of the seat adjustment is maintained for safety purposes.

Additionally, vehicles seats of the above type capable of forward and rearward adjustment usually utilize relatively expensive components to achieve adjustment difficult to manufacture and assemble.

OBJECTS OF THE INVENTION

It is an object of the invention to provide a vehicle seat platform support which is of economical construction, permits forward and rearward adjustment of the seat, and permits the seat to be easily assembled to its platform in a locked condition between its operable limits of adjustment.

Another object of the invention is to provide a seat platform for vehicles which permits the platform to be pivotally mounted adjacent its forward region, and yet permits the seat to be adjusted in forward and rearward directions between limits, and a detent is employed to lock the position of the seat supporting platform at a location intermediate its maximum limits of adjustment.

Yet a further object of the invention is to provide an adjustable seat platform for vehicles capable of adjustable movement in forward and rearward directions wherein the components are of low cost but of high strength, and wherein those components directly associated with the seat may be easily mounted upon the vehicle supported components which will automatically be locked upon the vehicle component upon assembly therewith.

SUMMARY OF THE INVENTION

Preferably, the seat structure platform described below is mounted for pivotal movement at its front edge so that the vehicle seat may be tilted forwardly to a partially inverted orientation to protect the seat from weather conditions or for access purposes. However, it will be appreciated that the seat platform of the invention may be directly mounted on the vehicle in a non-pivotal manner.

The primary component of the adjustable seat platform is a flat base plate formed of stamped steel having front and rear ends, a central region between the front and rear ends, upper and lower sides and parallel lateral edges extending between the front and rear ends. The base plate is preferably formed by a stamping operation of steel, and the lateral edges are formed as flanges including a riser extending above the central region, and the riser terminates in lips which extend away from the base plate central region and each have a linear edge, the lips of the base plate are parallel and form guides or ways.

The base plate central region is lanced to provide an upstanding detent shoulder which functions as a stop, and a plurality of spaced detent shoulders, which may be defined by holes, are formed in one of the lateral edge risers intermediate the base plate front and rear ends.

A pair of tabs lanced from the central region extend downwardly from the base plate at the lateral edges adjacent the front end, and these tabs may be pivotally connected to a pivot bracket mounted upon the vehicle by pivot pins wherein the base plate is capable of pivotal movement adjacent its front end.

The vehicle seat, not shown in the drawings for purposes of clarity, is mounted upon a seat mount plate of flat configuration which also includes front and rear ends, a central region, upper and lower sides and lateral edges. The lateral edges of the seat mount plate are parallel to each other, and are, preferably, formed in a downward manner and shaped to define U-shaped tracks adapted to extend over the base plate lips. Preferably, a non-metallic bearing material, preferably of a thermoplastic nature, is mounted upon the base plate lips and is located between the base plate lips and the seat mount plate tracks whereby the seat mount plate will be movable upon the base plate in forward and rear directions in a smooth, relatively noiseless manner.

The seat mount plate includes a spring engageable shoulder lanced from the seat mount plate central region extending from the lower side thereof forming a shoulder stop surface spaced from and parallel to the seat mount plate rear end. A leaf spring affixed to the base plate adjacent the base plate rear end includes a free front end extending above the base plate upper surface an extent higher than the vertical dimension of the base plate risers wherein, upon inserting the seat mount plate tracks upon the base plate lips at the rear end of the base plate, movement of the seat mount plate toward the base plate front end will cause the spring engageable shoulder of the seat mount plate to engage and depress the leaf spring permitting the shoulder to ride over the leaf spring to assemble the seat mount plate to the base plate as desired. Once the leaf spring passes the spring engageable shoulder, the leaf spring will move upwardly into an abutting relationship with the shoulder to limit rearward movement of the seat mount plate on the base plate.

Also, the spring engageable shoulder extends downwardly toward the base plate upper surface sufficiently to permit engagement of the shoulder with the base plate stop abutment, which will limit forward movement of the seat mount plate on the base plate. Of course, the spring engageable shoulder and the stop abutment will be spaced sufficiently from the rear edge of the seat mount plate and the front edge of the base plate, respectively, to permit a liberal extent of forward and rearward movement of the seat mount plate on the base plate to adjust the seat location for a particular operator, yet maintain sufficient engagement between the seat mount plate and the base plate to adequately support the seat mount plate and vehicle seat for safety purposes.

Adjustment of the seat mount plate intermediate its maximum forward and rearward positions is achieved by a detent lever pivotally mounted to the underside of the seat mount plate. The detent lever includes a handle portion extending beyond the front end of the seat mount plate as to be accessible to the operator, and the lever also includes a detent selectively engageable with a detent shoulder defined upon the base plate lateral edge riser. An extension spring biases the detent lever in a direction tending to engage the detent with a detent shoulder.

Because the seat mount plate may be easily mounted to the underside of the seat structure, and because the seat mount plate may be easily assembled to the base plate merely by sliding the seat mount plate over the rear end of the base plate, the adjustable seat platform of the invention permits the seat structure to be readily mounted upon the vehicle, the stop structure provides important safety features as it limits movement of the seat mount plate on the base plate, and the stamped configuration of the components permits the components to be manufactured at a relatively low cost.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
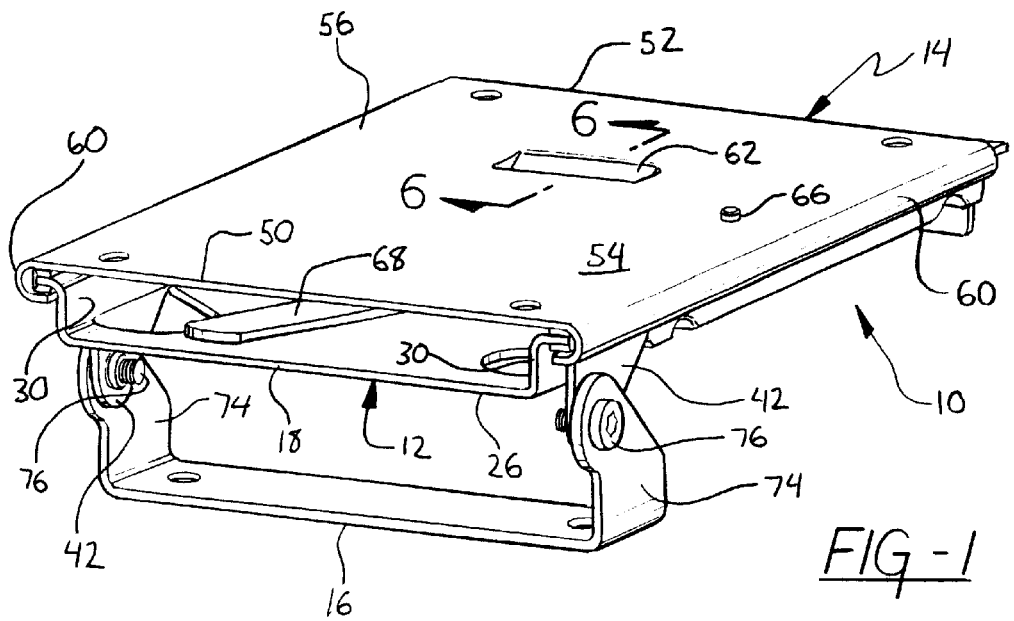
FIG. 1 is a perspective view of an adjustable seat platform in accord with the invention, the seat mount plate being assembled to the base plate and illustrated in an intermediate position thereon.

The assembled adjustable seat platform generally indicated at 10 is shown in FIG. 1, and the basic components of the seat platform include a base plate 12, a seat mount plate 14, and a pivot bracket 16. These components are described in detail below.

The base plate 12 is of a stamped steel construction and includes a front end edge 18 and a rear end edge 20 located between a flat central region 22 having an upper side 24 and a lower side 26. The base plate 12 central region includes parallel lateral edges in the form of flanges 28 extending upwardly with respect to the upper side 24, and the flanges 28 extend between ends 18 and 20. Each flange includes a riser 30 from which a lip 32 extends. The lips 32 formed on the two risers 30 extend away from each other and away from the central region 22. Each lip 32 terminates in a linear edge 34.

Preferably, a thermoplastic bearing material 36, such as U-shaped extrusion of nylon or the like, is mounted over the lips 32 and the edges 34, FIG. 3, for a purpose later described.

Figure 3:
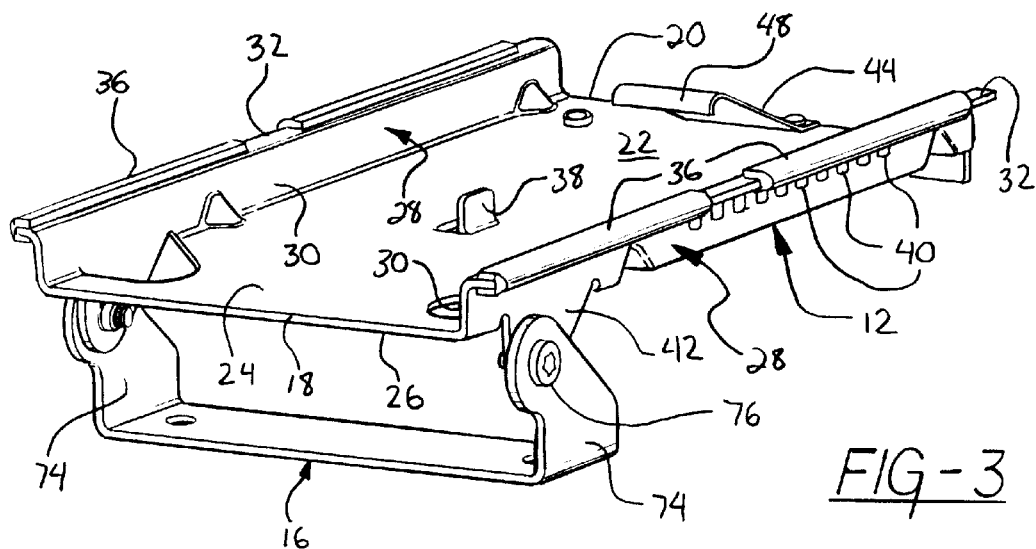
FIG. 3 is a perspective view of the base plate, per se, and the pivot bracket.

A stop abutment 38 is lanced from the base plate central region 22 in an upward direction extending above upper side 24 and the stop abutment 38, as will be appreciated from FIG. 3, has a length extending parallel to the flanges 28.

Figure 4:
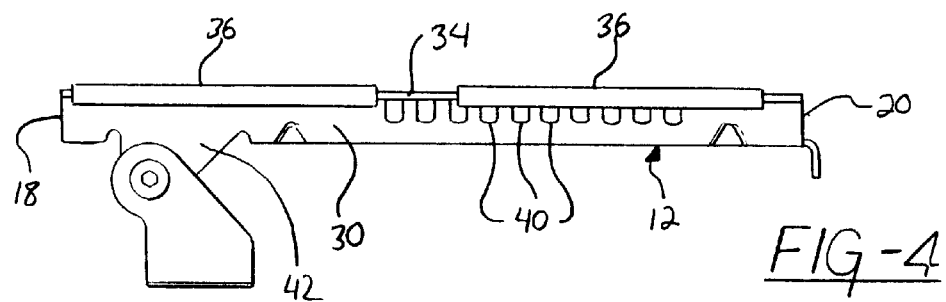
FIG. 4 is a side elevational view of the structure shown in FIG. 3 as taken from the right of FIG. 3.

Further, a plurality of evenly spaced detent holes 40 are defined in one of the flange's riser 30, FIGS. 3 and 4, forming shoulders at right angles to the length of the associated flange.

Figure 2:
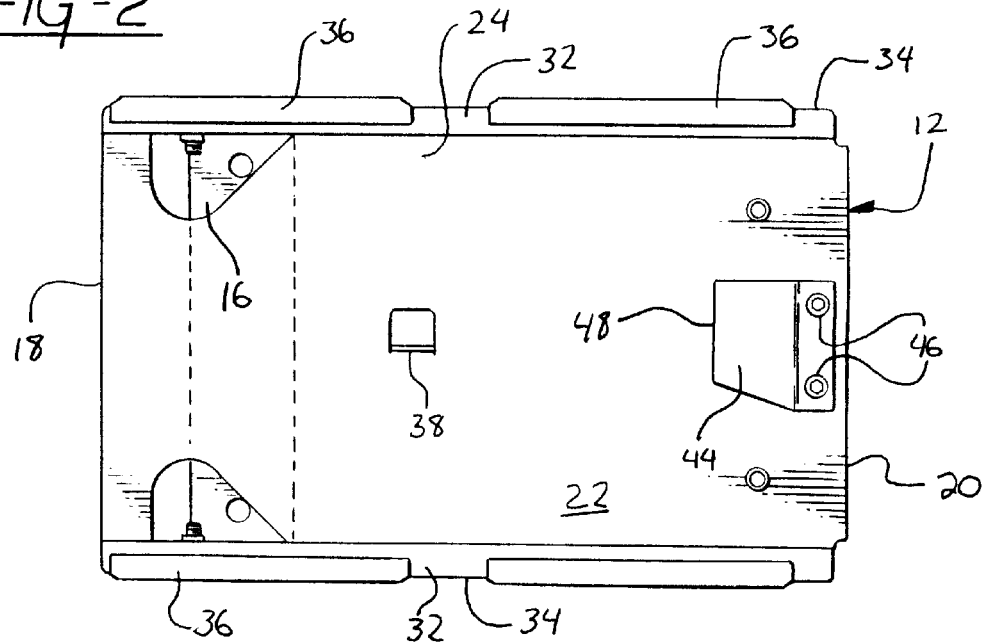
FIG. 2 is a top plan view of the base plate, per se, prior to assembly of the seat mount plate thereon.

A pair of pivot tabs 42 are defined adjacent the base plate front edge 18 from the material of the central region 22 as will be appreciated from FIGS. 2 and 3. The pivot tabs 42 are in alignment with a flange riser 30 and extend below the central region lower side 26. A pivot pin hole is defined in each pivot tabs 42.

Figure 6:
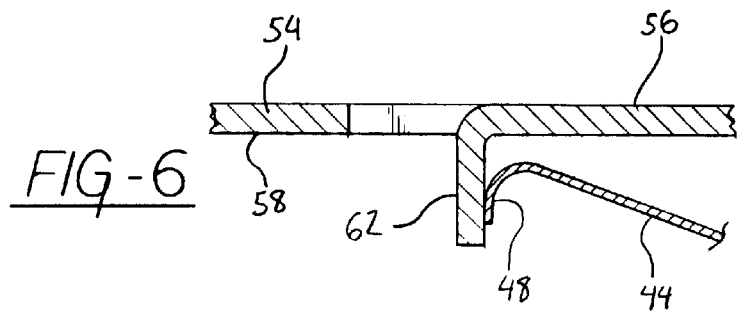
FIG. 6 is an elevational sectional view of the spring engageable shoulder as taken along Section 6—6 of FIG. 1.

A leaf spring 44 is attached to the base plate upper side 24 intermediate the base plate flanges 28 by fasteners 46. The leaf spring 44 includes a cantilevered free end 48 normally located spaced above the central region upper side 24, FIGS. 3 and 6, having a downwardly extending portion which serves to abut a stop shoulder as later described.

Figure 5:
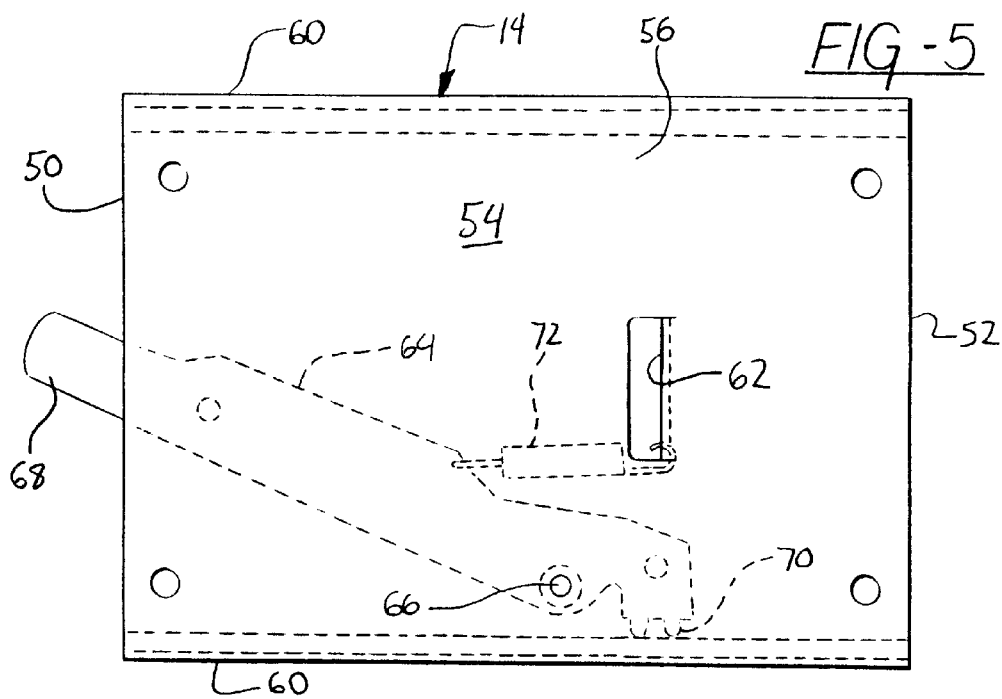
FIG. 5 is a top plan view of the seat mount plate, per se, the dotted lines illustrating seat mount plate structure located on the underside of the seat mount plate.

The seat mount plate 14 is best shown in FIGS. 1 and 5, and consists of a flat stamped steel member adapted to be attached to the bottom of a seat, not shown. The seat mount plate 14 includes a front end edge 50, a rear end edge 52, and a flat central region 54 having an upper side 56 to which the seat, not shown, is affixed by fasteners extending through the central region 54.

The lower side of the central region 54 is represented at 58, and each lateral edge of the central region 54 consists of a U-shaped track 60 which extends below the lower side 58. The tracks 60 each define a U-configuration void which encompasses the lips 32 of the flanges 28 of the base plate 12, and the bearing material 36 mounted upon the lips as will be apparent from FIG. 1. In this manner, the seat mount plate 14 is reciprocally mounted upon the base 12 for movement in a linear forward and rear direction, and the presence of the bearing material 36 makes this movement smooth and relatively noiseless in view of the self-lubricating aspect of the bearing material 36.

A spring shoulder 62 is lanced from the base plate central region 54 and extends downwardly from the lower side 58. The spring shoulder 62, as apparent in FIGS. 1 and 5, is spaced from the seat mount plate rear end edge 52 and is substantially parallel thereto.

A detent lever 64 is pivotally mounted upon the seat mount plate lower side 58 by a pivot 66, FIG. 5. The lever 64 includes a handle 68 which extends beyond the front end edge 50, FIG. 5, and is thereby accessible to the vehicle operator mounted upon the seat. The lever 64 also includes a pair of detents 70, and a tension spring 72 biases the lever 64 in the clockwise direction, FIG. 5, to bias the detents 70 toward the adjacent base plate flange 28 in which the detent holes 40 are formed. The spacing between the detents 70 and the detent holes 40 are equal wherein the two detents 70 will be received within two holes 40 when aligned, and thereby lock the seat mount plate 14 with respect to the base plate 12.

In most instances, it is desirable that the vehicle seat mounted upon the platform 10 be pivotal in a forward direction in order to protect the seat from weather, or to provide clearance during maintenance of the vehicle, as is commonly known. In such instance, the pivot tabs 42 are mounted on the pivot bracket 16 by the pivot bracket columns 74 having holes therein for receiving the pivot pins 76. The base of the bracket 16 includes mounting holes wherein the bracket may be bolted to the vehicle seat supporting surface, not shown, such as a transmission casing, housing, or the like.

In use, the pivot bracket 16 will be mounted to the base plate 12 to produce the assembly shown in FIG. 3. At this time, the seat mount plate 14 is not mounted upon the base plate 12 but bracket 16 may be bolted to the vehicle, not shown.

The seat mount plate 14 is then bolted to the bottom of the vehicle seat, not shown, by fasteners extending through the seat mount plate central region 54 so that the seat will be engaging upper side 56. Once the seat is mounted upon the seat mount plate 14 and side 56, the front end 50 of seat mount plate 14 can be aligned with the base plate rear end edge 20 so that the tracks 60 will receive the base plate lips 32 having the bearing material 36 mounted thereon. Once the tracks 60 are properly aligned with the lips 32, the seat mount plate 14 may be moved forwardly over the base plate 12. Such forward movement causes the spring shoulder 62 to engage the upstanding free end 48 of the leaf spring 44 depressing the spring end 48 so that the spring shoulder 62 will pass over the spring end 48. Once the shoulder 62 has cleared the spring end 48, the spring will be resiliently biased upwardly to be on a horizontal orientation with the shoulder 62 as will be appreciated from FIG. 6. Accordingly, rearward movement of the seat mount plate 14 on base plate 12 is limited by engagement of the spring free end 48 with the spring shoulder 62.

The spring shoulder 62 will also engage the stop abutment 38 to limit forward movement of the seat mount plate 14 on base plate 12, and the spring shoulder 62 and stop abutment 38 are spaced apart a distance sufficient to permit the desired movement of the seat mount plate 14 on base plate 12 between its maximum forward and rearward positions.

During adjustment of the seat mount plate 14 on base plate 12, the lever 64 will be pivoted in a counterclockwise direction, FIG. 5, to remove the detents 70 from the detent holes 40, and once the desired seat position is achieved, the handle 68 may be released to permit the detents 70 to enter detent holes 40 and thereby lock the relative position of the plates 12 and 14.

As the primary components of an adjustable seat platform in accord with the invention can be economically formed of sheet steel by known stamping and forming procedures, an economical platform is achieved capable of forward and rear adjustment, and wherein significant interconnection exists between the base plate 12 and seat mount plate 14 to meet safety requirements. As the seat mount plate 14 only needs to be slipped onto the base plate 12 from the rear of the base plate, it is possible to quickly assemble the seat structure to the base plate 12, for shipping purposes or the like. If it is desired to remove the seat mount plate 14 from base plate 12, a tool, such as a screwdriver, may be inserted between the plates 12 and 14 over the base plate rear end 20 to depress the leaf spring front end 48 sufficiently to permit the spring shoulder 62 to pass over the spring end 48.

It is appreciated that various modifications to the inventive concepts may be apparent to those skilled in the art without departing from the spirit and scope of the invention.

What is claimed is:

1. An adjustable seat platform for industrial and agricultural vehicles to permit forward and rearward seat adjustment comprising, in combination, a base plate having a front end, a rear end, a central region having upper and lower sides, and a pair of parallel lateral edges, said lateral edges each consisting of a flange having a riser extending from said central region upper side and a linear lip extending away from said central region, a plurality of spaced detent shoulders defined on one of said risers' of one of said flanges, a resilient leaf spring mounted on said base plate central region upper side adjacent said rear end, said leaf spring including a rear end affixed to said base plate and a free front end extending toward said base plate front end and spaced above said base plate central region upper side, a stop abutment defined on said base plate central region extending above said upper side thereof, a seat mount plate adapted to receive a seat and having a front end, a rear end, a central region having upper and lower sides and parallel lateral edges, said seat mount plate lateral edges comprising downward extending tracks extending over and around said base plate lips whereby said seat mount plate is slidably mounted on and linearly adjustable with respect to said base plate in forward and rearward directions, a spring engageable shoulder defined on said seat mount plate extending below said lower side thereof engageable with said spring free front end to limit rearward movement of said seat mount plate, said spring engageable shoulder being engageable with said base plate stop abutment to limit forward movement of said seat mount plate, and a detent lever pivotally mounted on said seat mount plate lower side pivotable between lock and release positions and having an accessible operating handle end and a detent selectively engageable with a detent shoulder to lock said seat mount plate upon said base plate in a predetermined relationship.

2. In an adjustable seat platform as in claim 1, a thermoplastic bearing material mounted on said base plate lips, said bearing material being located between said base plate lips and said seat mount plate tracks to facilitate seat mount plate adjustment on said base plate and reduce noise.

3. In an adjustable seat platform as in claim 1, said detent shoulders comprising a plurality of evenly spaced holes defined in said one of said risers.

4. In an adjustable seat platform as in claim 1, said stop abutment defined on base plate comprising a lanced portion of said base plate central region extending above said base plate central region upper side.

5. In an adjustable seat platform as in claim 1, an extension spring biasing said lever in a direction to engage said lever detent with said detent shoulders.

6. In an adjustable seat platform as in claim 1, said spring engageable shoulder defined on said seat mount plate comprising a tab lanced from said seat mount plate central region extending downwardly from said seat mount plate lower side.

7. In an adjustable seat platform as in claim 1, a pivot tab defined on said base plate adjacent the intersection of each base plate lateral edge and said base plate front end, said pivot tabs extending below said base plate lower side, a pivot bracket having a pair of upstanding columns, and a pivot connecting each of said columns to a pivot tab wherein said pivots are coaxially aligned and whereby upon mounting said pivot bracket upon a vehicle support said base plate and seat mount plate may be pivoted about said pivots to raise said base plate rear end.

* * * * *